(12) United States Patent
Eyhorn et al.

(10) Patent No.: US 7,125,596 B2
(45) Date of Patent: Oct. 24, 2006

(54) VACUUM INSULATION PANEL

(76) Inventors: Thomas Eyhorn, Walzlings 6, D-87452 Altusried (DE); Dieter Henn, Zugspitzstrasse 4, D-87448 Waltenhofen (DE); Hubert Stuhler, Albis 7, D-87477 Sulzberg (DE); Johann Klaus, Wies 3, D-87477 Sulzberg (DE)

( * ) Notice: Subject to any disclaimer, the term of this patent is extended or adjusted under 35 U.S.C. 154(b) by 33 days.

(21) Appl. No.: 10/838,753

(22) Filed: May 4, 2004

(65) Prior Publication Data

US 2004/0224120 A1     Nov. 11, 2004

(30) Foreign Application Priority Data

May 8, 2003    (DE)    ................................ 103 20 630

(51) Int. Cl.
 *B32B 1/04* (2006.01)
(52) U.S. Cl. ...................................................... 428/69
(58) Field of Classification Search .................. 428/69
 See application file for complete search history.

(56) References Cited

U.S. PATENT DOCUMENTS

| 4,950,450 | A | | 8/1990 | Chatterjee et al. |
| 5,512,345 | A | * | 4/1996 | Tsutsumi et al. ............. 428/69 |
| 5,911,903 | A | | 6/1999 | Eyhorn et al. |

FOREIGN PATENT DOCUMENTS

| DE | 1434 758 | 1/1971 |
| DE | 4339435 | 5/1995 |
| DE | 4342 947 | 6/1995 |
| DE | 4432896 | 3/1996 |
| DE | 10015876 | 10/2001 |
| DE | 10058565 | 2/2002 |
| DE | 10058566 | 2/2002 |
| EP | 0937939 | 8/2000 |
| EP | 1004358 | 2/2002 |
| EP | 1304315 | 4/2003 |
| GB | 625462 | 6/1949 |

OTHER PUBLICATIONS

English Derwent Abstract AN 2001-246316 [26] corresp. to DE 2001-246316 [26].
English Derwent Abstract AN 1999-470898 [4] corresp. to EP 0937939 B1.
English Derwent Abstract AN 1996-160880 [17] corresp. to DE 4432896 A1.
English Derwent Abstract AN 1995-195001 [26] corresp. to DE 4329435 A1.
English Derwent Abstract AN 2000-367005 [32] corresp. to DE 1 004 358 B1.

(Continued)

*Primary Examiner*—Alexander S. Thomas
(74) *Attorney, Agent, or Firm*—Collard & Roe, P.C.

(57) ABSTRACT

A vacuum insulation panel, comprising a thermally insulating plate with an planar topside and underside and a narrow side in an enclosure comprising a metal-containing film (foil), with a subatmospheric pressure prevailing in the enclosure and the enclosure surrounding the thermally insulating plate in a vacuum-tight manner. The enclosure has, on the narrow side, a weld seam with a projecting section of the foil. The narrow sides of the plate are beveled and the vacuum insulation panel is in the form of a parallelepiped. The weld seam with the projecting section of foil is arranged in such a manner that it allows the vacuum insulation panels to be assembled without gaps to form an insulating enclosure.

6 Claims, 2 Drawing Sheets

OTHER PUBLICATIONS

English Derwent Abstract AN 2002-189693 [25] corresp. to DE 100 58 565 A1.
English Derwent Abstract AN 2002-294022 [34] corresp. to DE 100 58 566 A1.
English Derwent Abstract AN 2003-374065 [36] corresp. to EP 1304315 A1.
English Derwent Abstract AN 1995-217126 [29] corresp. to DE 4342947 A1.
English Abstract corresp. to DE 1434758.
Patent Abstract of Japan corresp. to JP 07167377 A.
Patent Abstract of Japan corresp. to JP 07113493 A.
Patent Abstract of Japan corresp. to JP 07158792 A.

* cited by examiner

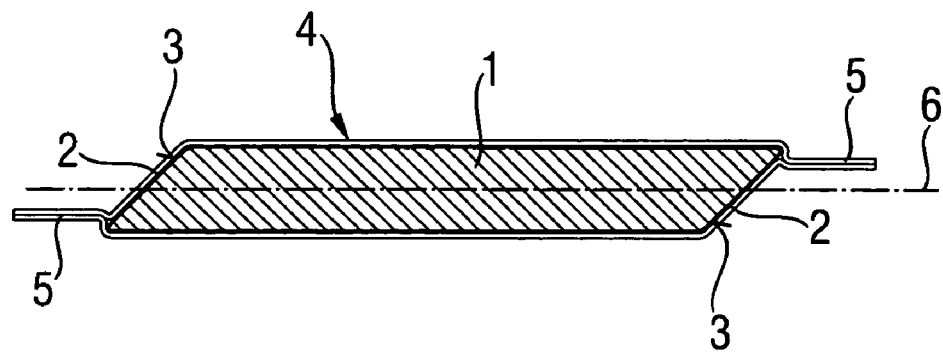
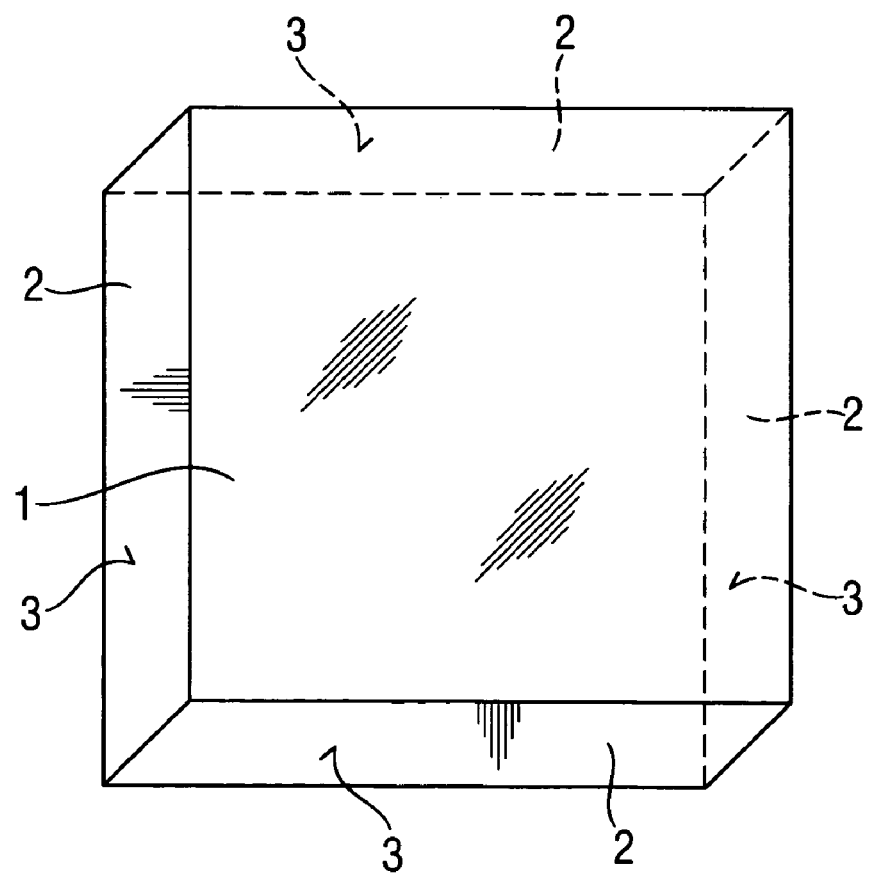

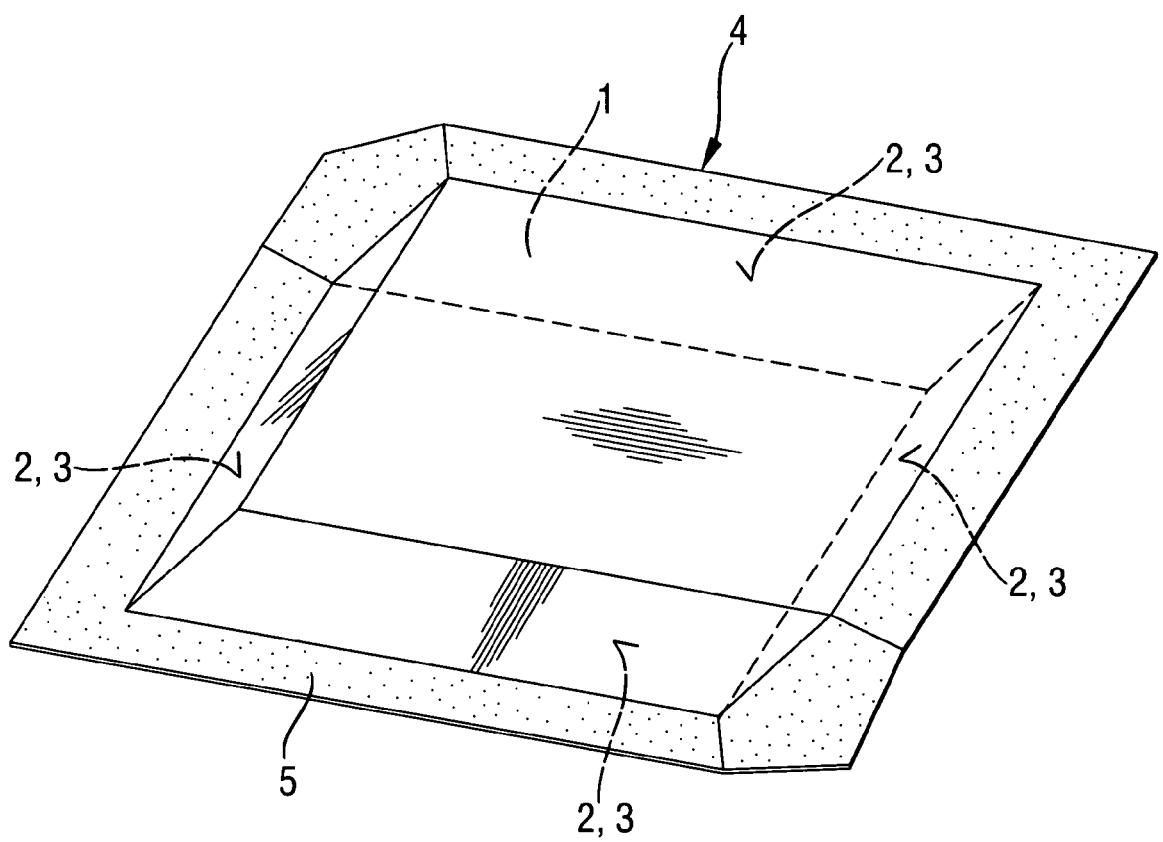

VACUUM INSULATION PANEL

BACKGROUND OF THE INVENTION

1. Field of the Invention

The invention relates to a vacuum insulation panel (VIP).

2. The Prior Art

The thermal conductivity of insulating plates can be drastically reduced if there is a vacuum in the system. This is known, for example, from U.S. Pat. No. 5,950,450 or German Patent No. DE 4339435. An inexpensive solution for producing a VIP of this type includes a microporous thermally insulating plate which is welded in a vacuum-tight manner into a composite foil. The composite foil used is either a prefabricated foil pouch, generally a sealed-edge pouch, or two foil blanks which are fed to the process. In both production variants, a central projecting section of foil remains on the VIP after evacuation as a result of the weld seams and/or plate shrinkage. This projecting section of foil causes problems when the VIPs are combined to form insulating enclosures such as transport boxes, since the thermally insulating plates cannot be fitted together without gaps and therefore heat bridges are formed, reducing the otherwise excellent insulating action.

To solve this problem, German Patent No. DE 10058566 to va-Q-tec proposes folding away the projecting section of foil using a folding technique. On a large industrial scale, this represents a complex and therefore expensive solution.

Another possible way of eliminating the disruptive influence of the projecting sections of foil consists in joining together the individual plates via plug-fit connections made from unevacuated insulating materials when an insulating enclosure is assembled. This is proposed in German Patent No. DE 100 58 565 to va-Q-tec.

Furthermore, there is a known cost-intensive process in which a vacuum-insulated plate is inserted into a thermoformed multilayer film and is closed off in a gastight manner with a planar film. As a result, the projecting section of film is always at the outer edge of the panel. Due to the use of the thermoformed films, this process is very cost-intensive and is also very inflexible with regard to the use of different geometries. Since films which contain metal layers (i.e. foils) cannot be thermoformed, thermoformed multilayer films do not include any metal layers.

SUMMARY OF THE INVENTION

It is an object of the present invention to provide a plate-like, evacuated and thermally insulating shaped body (vacuum insulation panel) which can be produced at low cost and which does not have the drawbacks which have been described when a plurality of vacuum insulation panels are being joined together to form an insulating enclosure.

The object is achieved by a vacuum insulation panel, comprising a thermally insulating plate with an planar topside and underside and a narrow side in an enclosure comprising a metal-containing film (foil), with a subatmospheric pressure prevailing in the enclosure and the enclosure surrounding the thermally insulating plate in a vacuum-tight manner. The enclosure has, on the narrow side, a weld seam with a projecting section of the foil. The narrow sides are beveled and the vacuum insulation panel is in the form of a parallelepiped and the weld seam with the projecting section of foil is arranged in such a manner that it allows the vacuum insulation panels to be assembled without gaps to form an insulating enclosure.

In one embodiment of the invention, the weld seam with the projecting section of foil is arranged so that it is located above or below the center of the narrow side of the thermally insulating plate. Moreover, it is preferable for a VIP of this type to be distinguished by the fact that the thermally insulating plate, at the transition from the topside or underside to the narrow side, has an edge with an angle of from 10° to 70° in combination with an angle from 170 v to 110°. An angle of 45° in combination with an angle of 135° is particularly preferred.

The thermally insulating plate is, for example, an open-cell, organic and inorganic foam, a fiber material or preferably plates made from microporous insulating material, as is known for example, from German Patent No. DE-4432896, U.S. Pat. No. 5,911,903, European Patent No. EP-B-0937939, European Patent No. EP-B-1004358 or European Patent No. EP-A-1304315. Mixtures containing pyrogenic silica are particularly preferred, and pyrogenic silicas with a BET >100 $m^2/g$ are especially preferred. The plate density is preferably >80 $kg/m^3$ (up to 300 $kg/m^3$).

The metal-containing film (foil) is preferably a composite foil having one or more metallized layers or a composite foil having a layer of metal, preferably aluminum.

Furthermore, the invention relates to a process for producing a panel according to the invention, in which a thermally insulating plate with an planar topside and underside and a narrow side is introduced into a gastight apparatus between two foil blanks, is evacuated to pressures of from 0.05–100 mbar and the foil blanks are sealed to one another on all sides, or is introduced into a gastight apparatus, into a foil pouch which has been prefabricated from a top foil and bottom foil and has at least one open side, and the foil pouch is then evacuated to pressures of from 0.05–100 mbar and sealed in a gastight manner on the open side. The thermally insulating plate is provided with a bevel on the narrow side and as a result, the length of the periphery of the thermally insulating plate changes on one side in such a manner that after the foil has been welded, the projecting section of foil lies above or below the center of the narrow side.

The foil blanks are preferably of equal size. For cost reasons, it is likewise preferable for the foil pouch to have a topside and underside which are of equal length on the open side. The differing peripheral length of the plate inevitably results in an off-center weld seam.

The projecting section of foil can therefore be positioned deliberately by making these modifications to the shape of the thermally insulating plate. In the case of conventional plates with right-angled edges, by contrast, the projecting section of foil is always located in the center of the narrow side if an inexpensive foil is used. This does not apply to thermoformed films, but the high price of these films, as has already been mentioned, means that they are not suitable for an inexpensive solution. Thermoformed films, unlike the foils which are used in accordance with the invention, do not contain metal.

An alternative way of achieving an off-center positioning of the projecting section of foil is for one of the two sides of the foil to be configured in such a manner as to be longer than the other side of the foil. However, since it is very expensive to configure the foils or foil pouch in this way, an embodiment of this type is not preferred.

The process according to the invention makes it possible to use inexpensive foils in the form of a pouch or as a foil blank, in which case the projecting section of foil at the weld seam can be deliberately positioned somewhere where it is not disruptive. Consequently, there is no longer any need for the complex folding measures or plug-fit connections which are known from the prior art.

Furthermore, it is less expensive to form the bevels on the narrow side of the plate than to use other measures. The bevels are preferably formed by machining a conventional plate or by press tools used during pressing of the plate.

A further advantage of the plates according to the invention with a beveled narrow side is that the dimensional tolerances which it is generally impossible to avoid during the production of VIPs have no adverse effects if the VIPs are fitted together to form planar applications, such as facade or cladding elements or floors or are assembled to form containers. In the case of conventional VIPs, these dimensional tolerances lead to undesired gaps and therefore heat bridges between the plates.

The invention therefore also relates to containers, such as transport containers, or refrigerators or planar applications, such as facade or cladding elements, or floors, which include VIPs according to the invention which have been joined together without gaps.

Furthermore, the invention relates to the use of the shaped bodies in accordance with the invention in transport containers, refrigerators and planar applications, such as facade or cladding elements or floors.

The VIPs according to the invention are in general suitable for use wherever a projecting section of foil on the VIP causes problems. Examples include transport boxes with a highly effective thermal insulation, a facade or cladding element comprising one or more plates, planar structures, such as the wall and floor of, for example, cold stores or buildings in which at least two plates installed mirror-symmetrically are used.

BRIEF DESCRIPTION OF THE DRAWINGS

Other objects and features of the present invention will become apparent from the following detailed description considered in connection with the accompanying drawing. It is to be understood, however, that the drawings are designed as an illustration only and not as a definition of the limits of the invention.

In the drawing, wherein similar reference characters denote similar elements throughout the several views:

FIG. 1 shows a cross section through and plan view of a VIP according to the invention;

FIG. 2 shows a perspective view of the plate according to the invention; and

FIG. 3 shows a perspective view of the VIP according to the invention.

DETAILED DESCRIPTION OF THE PREFERRED EMBODIMENT

The following example is used to further explain the invention in conjunction with the drawings:

EXAMPLE 1

A plate 1 made from a microporous, thermally insulating insulation material obtainable under the name Wacker WDS SiC NT from Wacker Chemie GmbH, Munich, with dimensions of 400×400×20 mm$^3$, is provided with a 45° bevel 3 on the narrow sides 2, by machining, so that it adopts the shape of a parallelepiped. After drying at 120° C. for 45 minutes, plate 1 is inserted into a flat pouch 4 (sealed edge pouch) made from a metallized high-barrier film (foil) with dimensions of 440×480 mm$^2$ available under the name V08621 from Hanita, Israel, and is sealed in a gastight manner on narrow side 2 of plate 1 at a pressure of <5 mbar. The sealing is carried out using a conventional packaging machine between two heated welding bars at a temperature of >90° C. The projecting section of foil 5 of the plate obtained in this way is located 8 mm away from the center 6 of narrow side 2.

Accordingly, while only a single embodiment of the present invention has been shown and described, it is obvious that many changes and modifications may be made thereunto without departing from the spirit and scope of the invention.

What is claimed is:

1. A vacuum insulation panel, comprising:
   an enclosure comprising a metal-containing film, wherein a subatmospheric pressure prevails in the enclosure;
   a thermally insulating plate with an planar topside and underside and four beveled narrow sides, said plate being disposed in said enclosure and being surrounded by the enclosure in a vacuum tight manner;
   wherein the enclosure has a weld seam on the narrow sides of the plate, said seam having a projecting section of the foil, and wherein said vacuum insulation panel is in the form of a parallelepiped and the weld seam with the projecting section of foil is arranged so that the weld seam allows the vacuum insulation panels to be assembled without gaps to form an insulating enclosure, and
   wherein the weld seam is located at two different planes, one half portion above and one half portion below a center of the narrow sides of the thermally insulating plate.

2. The vacuum insulation panel as claimed in claim 1, wherein a transition from the topside or underside to the narrow side has an edge with an angle of from 10° to 70° in combination with an angle of from 170° to 110°.

3. The vacuum insulation panel according to claim 2, wherein the transition has an edge with an angle of 45° in combination with an angle of 135°.

4. The vacuum insulation panel as claimed in claim 2, wherein the thermally insulating plate consists of an open-cell, organic and inorganic foam, a fiber material or a microporous insulating material.

5. The vacuum insulation panel as claimed in claim 1, wherein the metal-containing film is a composite foil having one or more metallized layers or a composite foil having a layer of metal.

6. A container or planar application comprising vacuum insulation panels that have been joined together without gaps, each of said vacuum insulation panels comprising:
   an enclosure comprising a metal-containing film, wherein a subatmospheric pressure prevails in the enclosure;
   a thermally insulating plate with an planar topside and underside and four beveled narrow sides, said plate being disposed in said enclosure and being surrounded by the enclosure in a vacuum tight manner;
   wherein the enclosure has a weld seam on the narrow sides of the plate, said seam having a projecting section of the foil, and wherein said vacuum insulation panel is in the form of a parallelepiped, and wherein the weld seam is located at two different planes, one half portion above and one half portion below a center of the narrow side of the thermally insulating plate.

* * * * *